United States Patent [19]

Lechevalier

[11] Patent Number: 5,501,245
[45] Date of Patent: Mar. 26, 1996

[54] COAXIAL PRESSURIZED FLUID FLOW REGULATOR

[75] Inventor: Michel Lechevalier, Mormant, France

[73] Assignee: Societe Nationale d'Etude et de Construction de Moteurs d'Aviation (S.N.E.C.M.A.), Paris, France

[21] Appl. No.: 323,932

[22] Filed: Oct. 17, 1994

[30] Foreign Application Priority Data

Oct. 20, 1993 [FR] France .................................. 93 12485

[51] Int. Cl.$^6$ .................................................. G05D 7/01
[52] U.S. Cl. .......................................... 137/117; 60/39.281
[58] Field of Search .......................... 137/117; 60/39.281

[56] References Cited

U.S. PATENT DOCUMENTS

| | | | |
|---|---|---|---|
| 2,957,488 | 10/1960 | Farkas | 137/117 |
| 3,901,263 | 8/1975 | Grunert | 137/117 |
| 4,578,945 | 4/1986 | Peck | 60/39.281 |
| 4,716,723 | 1/1988 | Ralston et al. | |
| 4,817,375 | 4/1989 | Brocard et al. | |

FOREIGN PATENT DOCUMENTS

| | | |
|---|---|---|
| 0278814 | 8/1988 | European Pat. Off. . |
| 0481620 | 4/1992 | European Pat. Off. . |
| 1541486 | 8/1968 | France . |
| 2117830 | 10/1983 | United Kingdom . |
| 2256729 | 6/1992 | United Kingdom . |
| 2093918 | 9/1992 | United Kingdom . |

WO90/01626 2/1990 WIPO .

*Primary Examiner*—Robert G. Nilson
*Attorney, Agent, or Firm*—Bacon & Thomas

[57] ABSTRACT

A pressurized fluid flow regulator for controlling fluid in a fluid circuit is disclosed having a high pressure feed chamber in fluid communication with a source of pressurized fluid and with an exhaust chamber which, in turn, has a fluid outlet connected to the device to receive the pressurized fluid. A first valve controls the flow of fluid between the high pressure feed chamber and the exhaust chamber, while a second valve opens and closes the fluid outlet of the exhaust chamber. The regulator also includes a bypass chamber having an inlet in fluid communication with the high pressure feed chamber and an outlet in communication with the inlet of the source of pressurized fluid. A valve system controls the opening and closing of the bypass chamber inlet such that the inlet is opened when the fluid pressure in the high pressure feed chamber exceeds a threshold value so as to avoid over pressurization of the fluid in the system. The first valve has a valve member slidably located in a valve body of the flow regulator so as to slide along an axis of movement, such relative movement between the first valve member and a cylindrical valve opening serving to regulate the fluid flow between the high pressure feed chamber and the exhaust chamber. The first valve member has a valve surface which extends obliquely to its axis of movement such that such axial movement varies the cross-sectional area of the opening connecting the high pressure feed chamber and the exhaust chamber to thereby regulate the fluid flow between these chambers.

9 Claims, 7 Drawing Sheets

COAXIAL PRESSURIZED FLUID FLOW REGULATOR

BACKGROUND OF THE INVENTION

The present invention relates to a pressurized fluid flow regulator, more particularly such a fluid flow regulator utilized in a fuel regulating system for an aircraft gas turbine engine.

All gas turbine engines, and in particular those used in aircraft, are equipped with a fuel flow regulating system to control the flow of fuel to the engine to enable it to meet required thrust conditions which may vary as a function of flight altitude and flight mission. Accurate control of the fuel flow into the engine is especially important when starting the engines.

Accurate fuel flow regulation is required in order to preclude either overheating the engine components, such as turbine blades, or to avoid engine flame-outs caused by insufficient fuel flow.

Such fuel flow regulating systems may be hydromechanical systems, as in older gas turbine engines, or they may be controlled electronically by analog or digital electronic systems which full redundant override functions. Regardless of which system is utilized, the mechanical systems receiving the commands from the electronic controls must react properly to pressurize, meter, recycle or stop the fuel flow. The known mechanical systems are quite sophisticated and incorporate many designs. However, as a rule, each of the separate functions of the fuel flow regulating system is carried out by a separate mechanism.

SUMMARY OF THE INVENTION

It is an object of the present invention to consolidate several of the functions into one mechanism for regulating a pressurized fluid flow and to thereby gain an increase in compactness and a decrease in weight for the flow regulator system. A pressurized fluid flow regulator for controlling fluid in a fluid circuit is disclosed having a high pressure feed chamber in fluid communication with a source of pressurized fluid and with an exhaust chamber which, in turn, has a fluid outlet connected to the device to receive the pressurized fluid. A first valve controls the flow of fluid between the high pressure feed chamber and the exhaust chamber, while a second valve opens and closes the fluid outlet of the exhaust chamber. The regulator also includes a bypass chamber having an inlet in fluid communication with the high pressure feed chamber and an outlet in communication with the inlet of the source of pressurized fluid. A valve system controls the opening and closing of the bypass chamber inlet such that the inlet is opened when the fluid pressure in the high pressure feed chamber exceeds a threshold value so as to avoid over pressurization of the fluid in the system.

The first valve has a valve member slidably located in a valve body of the flow regulator so as to slide along an axis of movement, such relative movement between the first valve member and a cylindrical valve opening serving to regulate the fluid flow between the high pressure feed chamber and the exhaust chamber. The first valve member has a valve surface which extends obliquely to its axis of movement such that such axial movement varies the cross-sectional area of the opening connecting the high pressure feed chamber and the exhaust chamber to thereby regulate the fluid flow between these chambers. The first valve member is operatively connected to the electronic control system such that its position may be regulated according to the needs of the gas turbine engine.

The third valve assembly has a second valve member slidably located in the first valve member so as to be movable relative to the first valve member and to the valve body. The second valve member has a valve surface generally conical in configuration which bears against a valve seat formed in a sliding block which is slidably located in the bypass chamber. The sliding block is biased into contact with a valve seat formed in the valve body. When the pressure in the high pressure feed chamber exceeds a threshold value, the second valve member is displaced away from the opening in the slide block which enables a portion of the pressurized fluid to be vented and to be returned to the high pressure source, which typically comprises a pump. Should the pressure in the high pressure feed chamber continue to increase, it acts on a face of the slide block to displace it away from its seat thereby allowing greater communication between the exhaust chamber and the high pressure feed chamber to further vent the pressurized fluid back into the supply for the pressure source.

The second valve may comprise a valve piston movable so as to open or close the fluid outlet of the exhaust chamber. Under operating conditions, the valve piston is acted on by the pressurized fluid in the exhaust chamber and moved to an open position to enable the pressurized fluid to communicate with the engine or other fluid actuated device. When it is desired to shut off the engine or terminate operation of the device, a normally closed control valve is opened to thereby allow pressurized fluid from the fluid pressure source to act on an opposite face of the piston valve so as to urge it to its closed position, thereby shutting off fluid to the engine or to the device.

The pressurized fluid flow regulator according to the invention meters the flow the pressurized fluid, as well as regulates the pressure of the pressurized fluid within the high pressure feed chamber. The flow regulator is more compact since the chambers are coaxial, resulting in a weight reduction over the prior art systems and is more reliable and efficient than the known regulators.

DETAILED DESCRIPTION OF THE PREFERRED EMBODIMENTS

Figure 1:
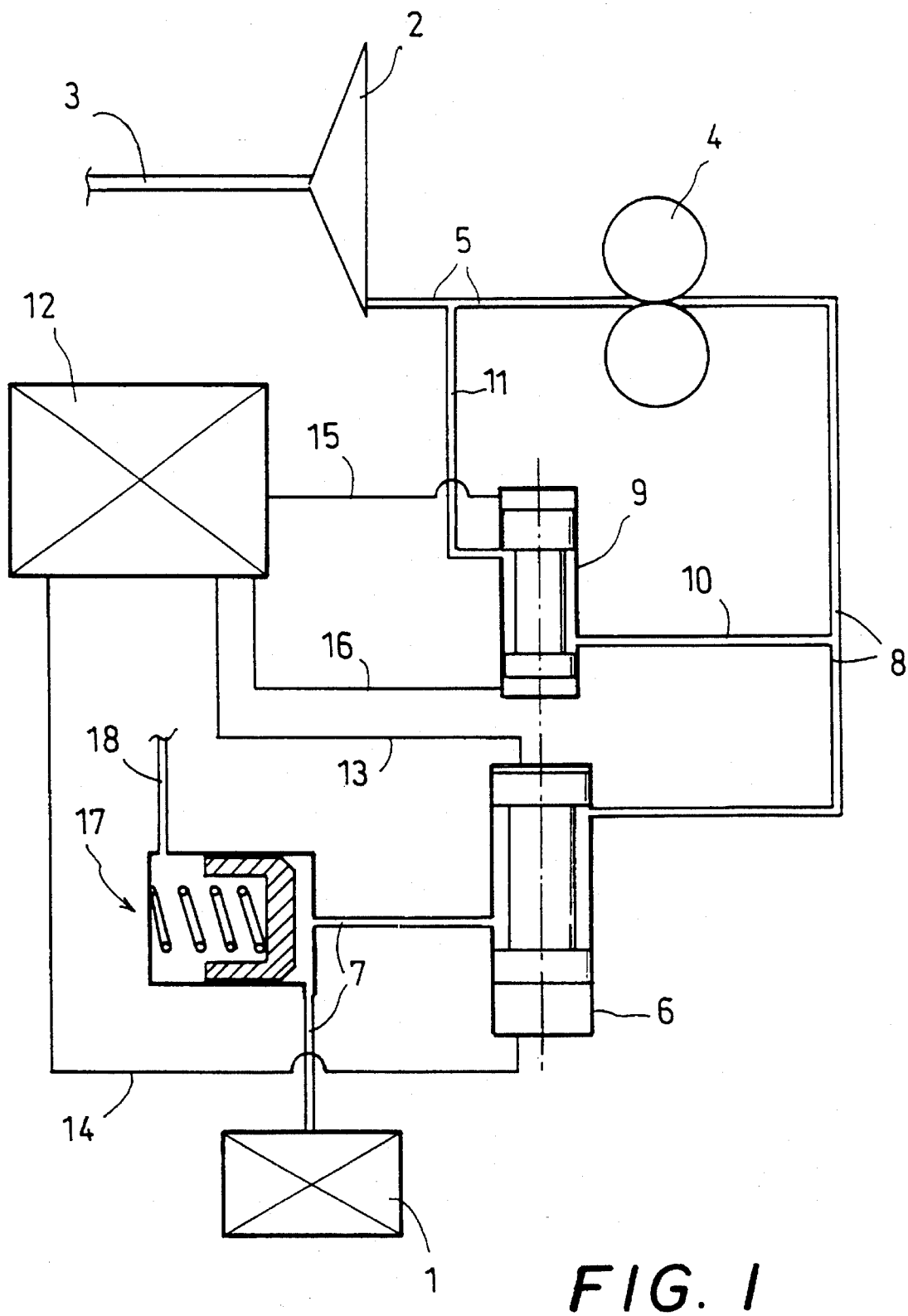
FIG. 1 is a schematic diagram showing a fluid regulation circuit for a pressurized fluid flow.

FIG. 1 illustrates a typical pressurized fluid circuit, in this particular instance, a fuel feed circuit for a gas turbine engine. Although the invention will be described in terms of usage in such a circuit, it is to be understood that the principles elucidated herein can be utilized to control any type of pressurized fluid circuit.

The typical gas turbine engine fuel feed circuit comprises a booster pump 2 having a suction inlet conduit 3 connected to a fuel tank (not shown), a main high pressure pump 4 having its inlet connected to the outlet of the booster pump via conduit 5, the outlet of the high pressure pump 4 being connected to a fuel flow metering device 6 via conduit 8. The circuit also includes an operating device 1, in this particular instance gas turbine engine fuel injectors, which are linked by conduit 7 to the metering device 6. A bypass valve 9 is connected via conduit 10 to the conduit 8 and to conduit 5 via conduit 11. A hydromechanical or electronic control device 12 is connected via connection means 13 and 14 to the drive means of the metering device 6, and to the drive means for the bypass valve 9 via connection means 15 and 16. Thus, the hydromechanical or electronic control 12 controls the positions of the metering device 6 as well as the bypass valve 9. A sealing valve 17 is located in the conduit 7 and is connected by connection means 18 to a selector to determine its position.

The metering device 6 allows only a portion of the fuel delivered by the main pump 4 into the conduit 8 to pass through the conduit 7. The excess fuel delivered into the conduit 8 is moved through the conduit 10 into the bypass valve 9 which, in turn, directs this excess fuel flow to the conduit 5 and back to the suction side of the main pump 4. The control 12 determines the commands to the metering device 6 and the bypass valve 9 as a function of the needs of the gas turbine engine depending upon the operating mode of the engine. Sealing valve 17 either stops the feed to the fuel injectors 1 to stop the engine, or allows the feed to continue, for instance, during gas turbine engine start.

Figure 2:
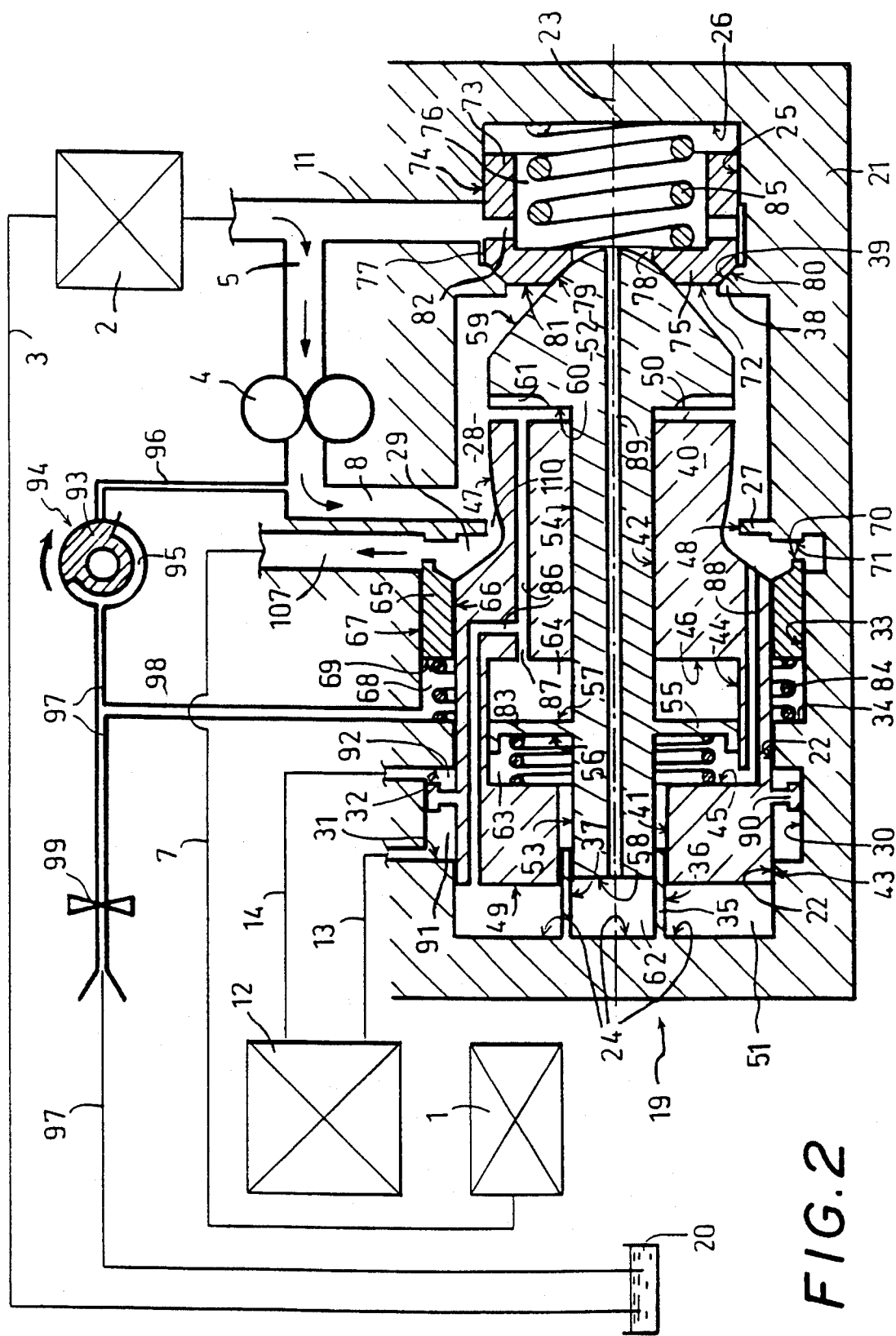
FIG. 2 is a cross-sectional view of the fluid flow regulator according to the present invention in a first operational configuration.

The instant invention proposes to improve the regulation of the pressurized fluid flow by a single regulator assembly which consolidates the above metering, bypass and sealing functions. The coaxial pressurized fluid flow regulator according to the present invention is illustrated in FIG. 2 wherein its connection to the previously described circuit is illustrated by elements having common reference numerals to those in FIG. 1. In FIG. 2 the fuel tank 20 is illustrated as being connected to the booster pump 2 via conduit 3. The coaxial pressurized fluid flow regulator 19 comprises a valve body 21 defining a first bore 22 extending about an axis of revolution 23 with a first end 24 extending generally perpendicular to the axis 23. The valve body 21 also defines a second bore 25 which is also concentric about axis 23 and has a second end 26 which, again, extends generally perpendicular to the axis 23. The body 19 also defines a third bore 30 which extends along the axis 23 and which has opposite end faces 31 and 32 extending perpendicular to the axis 23. A fourth bore 33 is defined by the valve body 19 which extends along the axis 23 and which has an end 34 extending generally perpendicular to the axis 23.

Transverse partition 27 separates high pressure feed chamber 28 from exhaust chamber 29 and defines .a cylindrical opening 48 allowing fluid communication between the high pressure feed chamber 28 and the exhaust chamber 29. A tubular protrusion 35 extends from end wall 24 into the bore 22 and is concentric about axis 23. Wall 38 separates the high pressure feed chamber 28 from the bypass chamber 77 and defines an opening which allows fluid communication between the high pressure feed chamber 28 and the bypass chamber 77. Wall 38 also defines a generally frustoconical valve seat 39 which extends about axis 23. Tubular segment 35 has a generally cylindrical outer surface 36 and a generally cylindrical inner surface 37, both of which extend concentrically about axis 23.

A first valve member 40 is slidably located within body 21 so as to move along axis 23. Valve member 40 defines generally cylindrical bores 41 and 42 which are both concentric about axis 23, and bore 41 is sized so as to slidably bear against the outer cylindrical surface 36 of protrusion 35. Valve member 40 also defines a cavity 44 extending about axis 23 which is bounded by opposite ends 45 and 46 which extend generally perpendicular to the axis 23. A valve surface 47 which extends obliquely to the axis 23 is formed on an outer surface of the valve member 40 such that the valve surface 47, in conjunction with the cylindrical opening 48 define a passage 110 which allows fluid to pass between the high pressure feed chamber 28 and the exhaust chamber 29. The obliqueness of the surface 47 relative to the axis 23 varies in a direction along the axis 23 such that relative movement between the valve member 40 and the stationary partition 27 will cause the cross-sectional area of the passage 110 to also vary, thereby controlling the flow of fluid between the high pressure feed chamber 28 and the exhaust chamber 29. The valve surface 47 is symmetrical about axis 23. Valve member 40 has two generally transverse end surfaces 49 and 50 both extending generally perpendicular to the axis 23 so as to thereby define actuator chamber 51 extending between end surface 49 and surface 24 of the valve body 21. As can be seen in FIG. 2, the transverse end surface 50 is located within and is acted on by the fluid in the high pressure feed chamber 28.

A second valve member 52 is slidably located in valve body 21 so as to also move along axis 23. As can be seen, valve 52 is slidably mounted within valve 40 and serves to regulate the pressure of the fluid in the high pressure feed chamber 28. Valve 40 meters the fluid flow between the high pressure feed chamber 28 and the exhaust chamber 29. The second valve member 52 defines generally cylindrical surfaces 53 and 54 such that surface 53 slidably engages the inner cylindrical surface 37 of the protrusion 35, while surface 54 slidably contacts surface 42 defined by the first valve 40. The diameters of the cylindrical surfaces 53 and 54 are substantially equal and both of the surfaces are coincident about axis 23. The surfaces 53 and 54 lie on opposite sides of piston 55 which is rigidly affixed to or integrally formed with the valve member 52 such that it slidably extends into bore 44 formed in the valve 40. Piston 55 has opposite faces 56 and 57 such that actuating chamber 63 is formed between face 56 and transverse face 45 of the first valve 40 and actuating chamber 64 is defined by the piston face 57 and the transverse wall 46 also located on valve 40. Valve member 52 defines a transverse end surface 58 which faces the portion of end wall 24 located within the cylindrical protrusion 35 so as to define there-between actuating chamber 62. The opposite end of the valve 52 forms a generally conical valve surface 59 which is symmetrical about axis 23 and which tapers inwardly in a direction extending away from transverse end surface 58. Transverse surface 60, which extends generally perpendicular to the axis 23, connects the generally conical valve surface 59 to the generally cylindrical surface 54, the transverse surface 60 defining a plurality of radially extending grooves 61.

Valve piston 65 has a generally cylindrical configuration extending symmetrically about axis 23 and has surface 66 in sliding contact with cylindrical surface 43 of the valve 40. Valve piston 65 has external axial surface 67 which is slidably in contact with a bore 33 formed in the valve body 21. Both the valve piston 65 and the axial surface 67 are symmetrical about axis 23. Valve piston 65 is sealingly slidable in the bore 33 formed in the valve body 21 and movable relative to the cylindrical surface 43 of the valve 40. Actuating chamber 68 is defined by the bore 33, the cylindrical surface 43, the transverse end 34 and a transverse surface 69 formed on the valve piston 65 which extends generally perpendicular to axis 23. Transverse surface 70 is formed on the valve piston 65 and extends generally perpendicular to the axis 23, and is located such that when the valve piston is in its closed position, the transverse surface 70 bears against surface 71, also extending generally perpendicular to axis 23 and defined on the partition 27, so as to close the exhaust conduit 107 and fluid terminate communication between exhaust chamber 29 and the exhaust conduit 107.

Slide block 72 is slidably located in exhaust chamber 77 and comprises a generally a tubular wall 73 having an external cylindrical surface 74 sealingly slidably bearing against bore 25, the cylindrical surface 74 and the tubular wall 73 both extending symmetrically about axis 23. A transverse end wall 75 extends generally perpendicular to axis 23 and is connected to one end of tubular wall 73, the transverse end wall 75 having an opening 78 defining an inlet to the bypass chamber 77. The cylindrical wall 73, the end wall 75 as well as the transverse end wall 26 define a cavity 76 within the slide block 72 which communicates with the bypass chamber 77 via passages 82 formed in the tubular wall 73. As can be seen, cavity 76 is also in fluid communication with the opening 78. Thus, fluid communication between the high pressure feed chamber 28 and the bypass chamber 77 may take place through opening 78, cavity 76 and passages 82. End wall 75 also defines a frusto-conical surface 79 adjacent to the central opening 78 and a frusto-conical surface 80 located so as to sealingly contact the conical valve seat 39 formed on the wall 38. Transverse end wall 75 also defines a valve surface 81 which faces toward the high pressure feed chamber 28 and which may be acted on by pressurized fluid in chamber 28.

Spring 83 operably extends between transverse wall 45 and surface 56 of the piston 55 so as to urge piston 55 away from the transverse wall 45 thereby causing the valve surface 59 to seal against the frusto-conical surface 80 of the slide block 72. Spring 84 is operably interposed between the transverse wall 34 and the surface 69 of the valve piston 65 so as to urge the surface 70 of the piston 65 against the surface 71 formed on the partition 27 to thereby prevent communication between the exhaust chamber 29 and the exhaust conduit 107. Spring 85 is operably inserted between the end 26 of the bore 25 and the slide block 72 so as to urge the slide block 72 toward the left as illustrated in FIG. 2 thereby urging frusto-conical surface 80 into sealing contact with the frusto-conical valve seat 39.

Valve 40 defines a conduit 86 which extends between the transverse end 50 and the opposite end 49, thereby enabling communication between the high pressure feed chamber 28 and actuating chamber 51. Conduit 87 connects the conduit 86 with the actuating chamber 64 such that the fluid pressure in the high pressure feed chamber 28 acts on surface 57 of the piston 55. Valve 40 also defines conduit 88 which permits fluid communication between the exhaust chamber 29 and actuating chamber 63 such that the pressure in the exhaust chamber 29 acts on side 56 of piston 55. Second valve member 52 defines conduit 89 which extends substantially along the entire length of the valve member 52 enabling fluid communication between chamber 62 and cavity 76.

As can be seen in FIG. 2, the conduit 8 is connected to the outlet of the high pressure pump 4 and feeds the pressurized fluid into the high pressure feed chamber 28 while conduit 11 connects the bypass chamber 77 to the conduit 5 and, consequently, the inlet of the high pressure pump 4. The operating device, in this particular instance gas turbine fuel injectors, are connected to the exhaust conduit 107 via conduit 7, and consequently, to the exhaust chamber 29.

A piston 90 is fixedly attached to, or formed integrally with the first valve 40 such that it slides in a sealing manner with the bore 30 so as to define chamber 91 between one side of the piston and the transverse end 31, and chamber 92 between an opposite side of the piston 90 and the transverse wall 32. Chamber 91 is connected to the control device 12 via conduit 13 while chamber 92 is connected to the control means via conduit 14.

Valve 94 has an inlet connected to the conduit 8 via conduit 96 and an outlet connected to conduit 97. Movable valve member 93 within the valve 94 controls the communication between internal valve chamber 95 and the conduits 96 and 97. Conduit 97 is also in fluid communication with chamber 68 via conduit 98. Constriction 99 is located in the conduit 97 between the fuel tank 20 and the junction between conduits 97 and 98.

Figure 5:
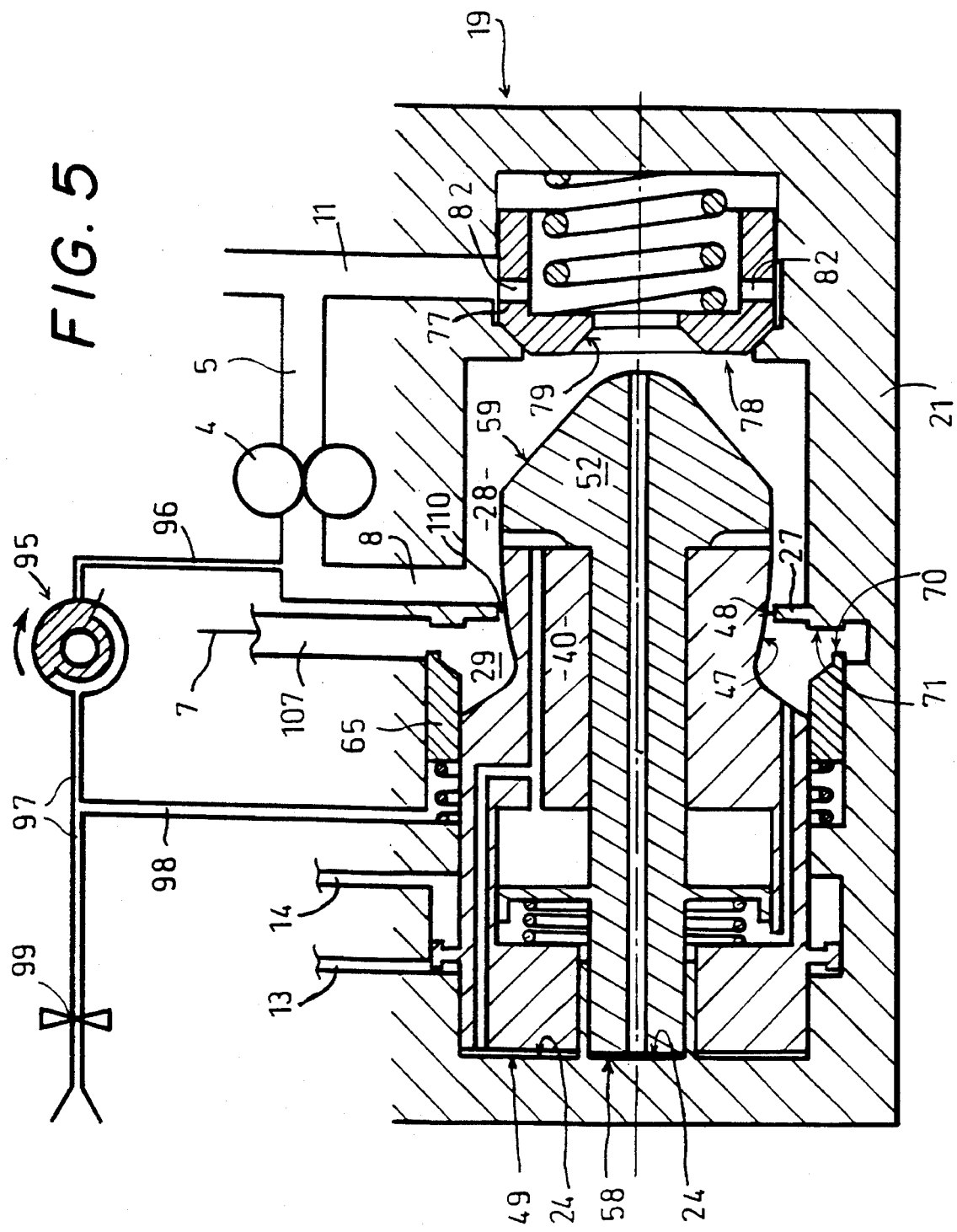
FIG. 5 is a cross-sectional view similar to FIG. 2, illustrating the flow regulator in a fourth operational configuration.
Figure 6:
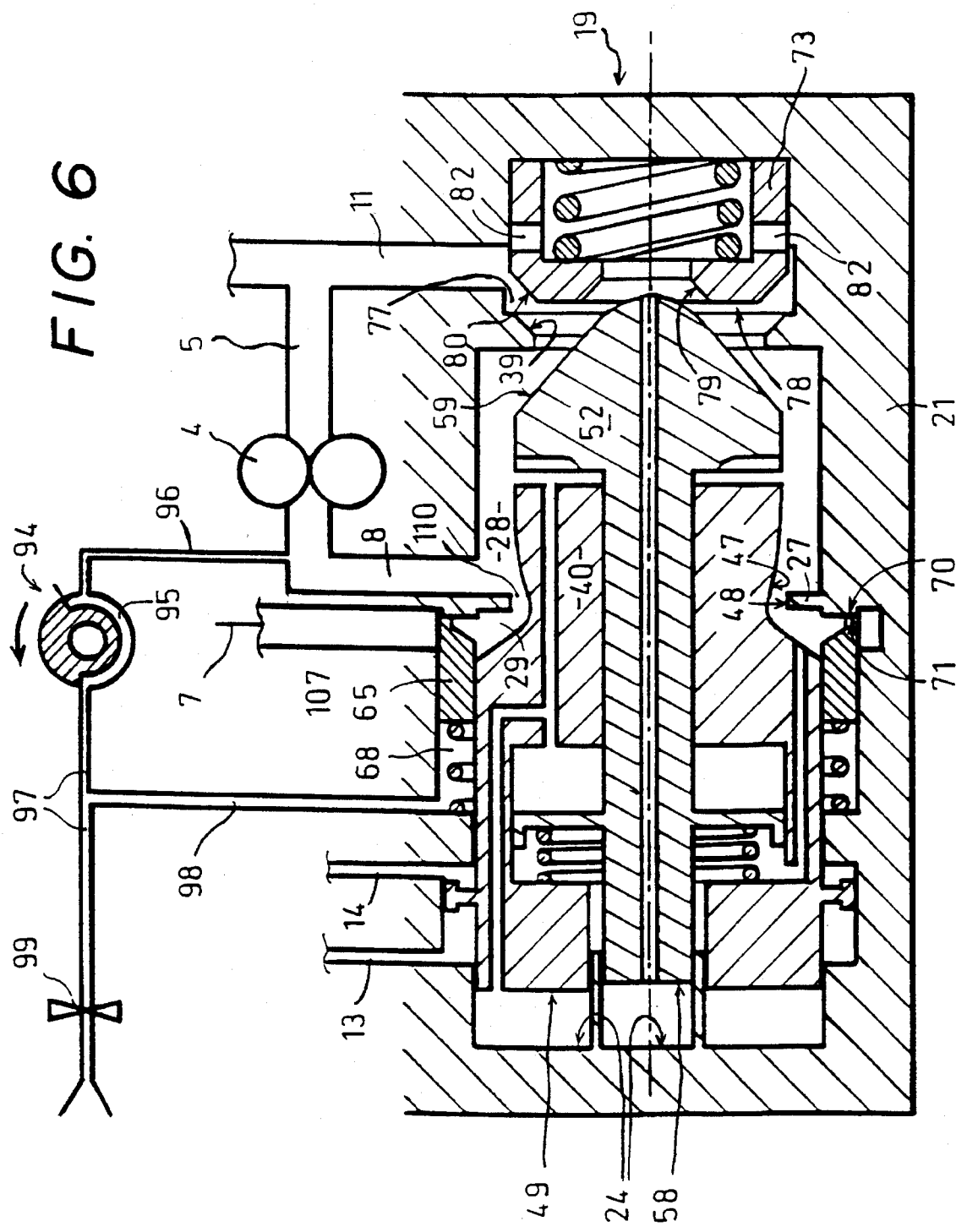
FIG. 6 is a cross-sectional view similar to FIG. 2, illustrating the flow regulator in a fifth operational configuration.
Figure 7:
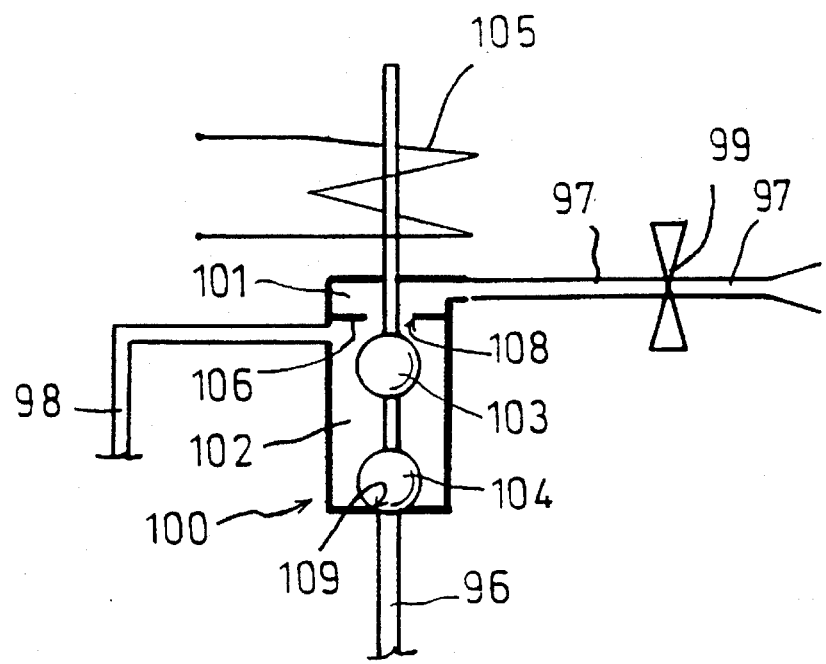
FIGS. 7 and 8 are schematic illustrations of two operating positions of an alternative embodiment of a control valve utilized in the fluid flow regulator according to the present invention.
Figure 8:
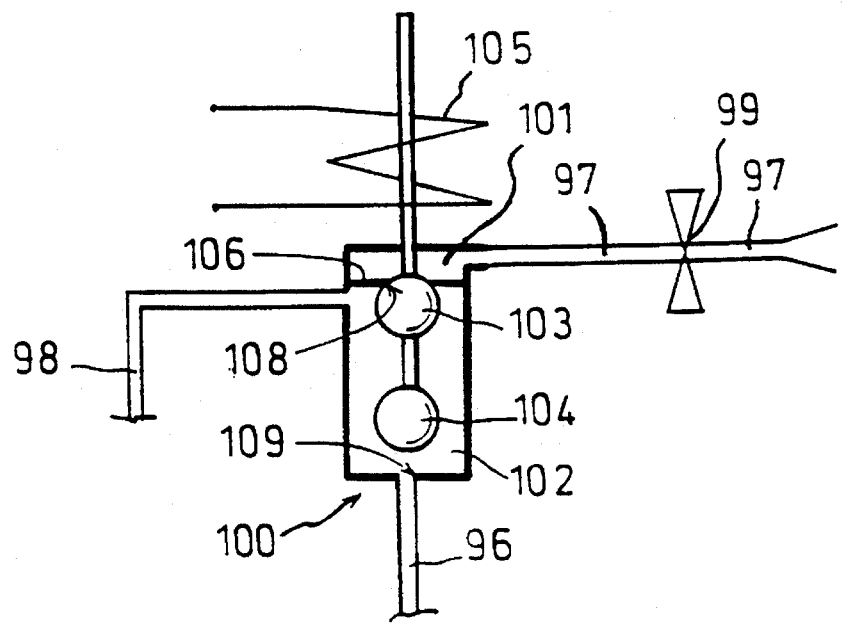

The valve 94 illustrated in FIGS. 2–6 can be replaced by the valve 100 illustrated in FIGS. 7 and 8. In this alternative construction, valve 100 defines two chambers, 101 and 102, which communicate with each other via passage 108 formed in partition 106. Chamber 101 communicates with conduit 97, while conduit 98 is in fluid communication with chamber 102. The chamber 102 also is in fluid communication with conduit 96 via passage 109. A movable valve element with valve members 103 and 104 selectively close one of the passages 108 or 109 when actuated by an electromagnet 105. As illustrated in FIG. 7, the passage 109 is closed by valve element 104 thereby allowing fluid communication between conduits 98 and 97 via the passage 108. In FIG. 8, the valve element 103 has closed passage 108 and opened passage 109 thereby allowing fluid communication between conduit 98 and conduit 96.

The magnitudes of the dimensions of the transverse walls 49, 50, 56, 57, 58, and 59 are selected such that the various moving parts of the coaxial fluid flow regulator shall be in equilibrium, in particular the two valve members 40 and 52, as a function of the applicable equations of mechanics and hydraulics. Attention must be given to the opening 110 with its variable cross-sectional area connecting the high pressure feed chamber 28 to the exhaust chamber 29 and introducing a pressure drop in the fluid as it passes between these chambers.

Figure 3:
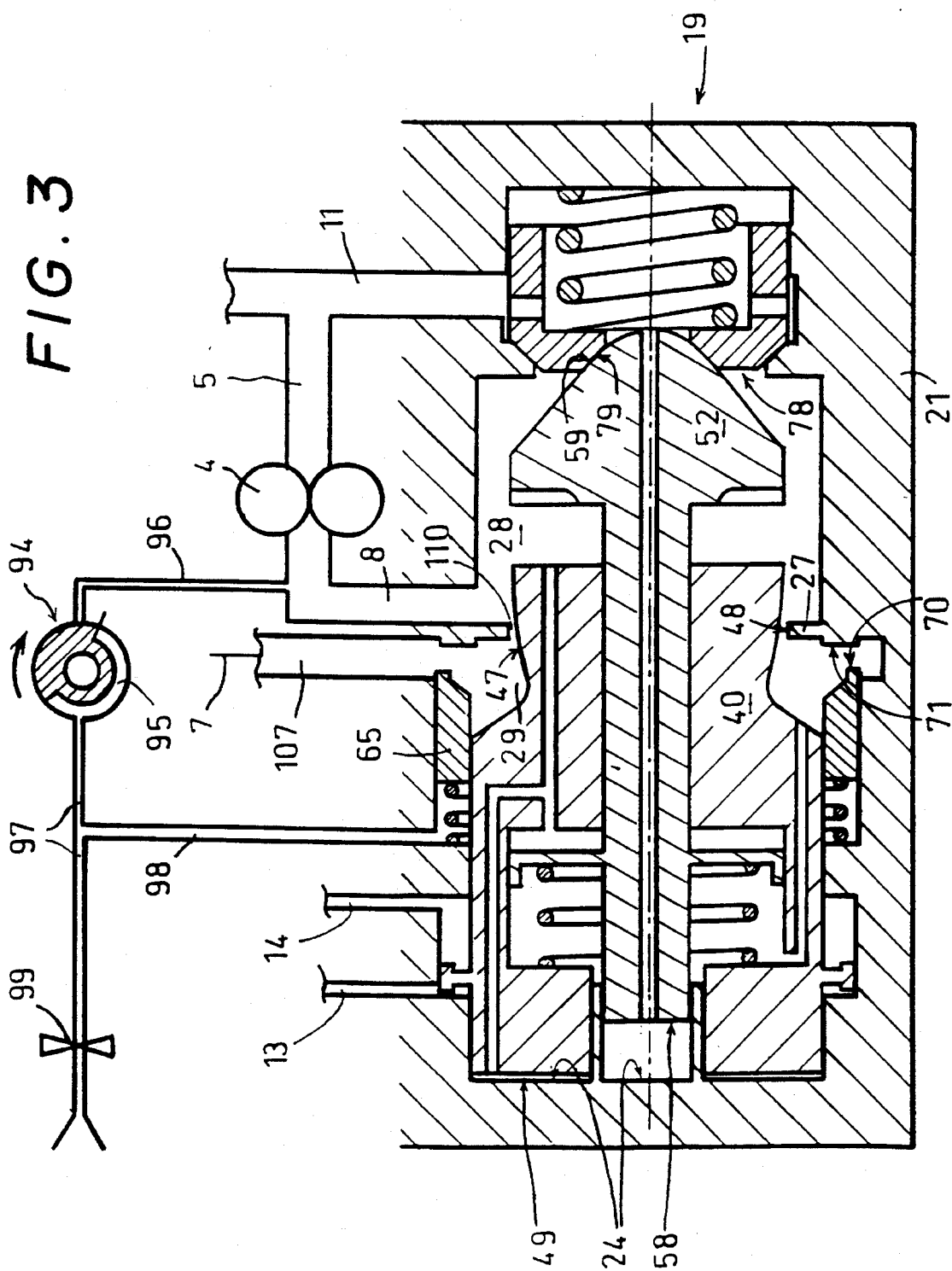
FIG. 3 is a cross-sectional view similar to FIG. 2, illustrating the flow regulator in a second operational configuration.

The pressurized fluid flow regulator according to this invention, achieves fluid flow metering by using the movement of the valve 40, it being assumed that, as illustrated in FIGS. 2 and 3, that valve 94 has closed off communication between conduits 96 and 97 and that, consequently, the slide valve 65 is open such that the surface 70 is displaced away from the surface 71 thereby facilitating communication between the exhaust conduit 107 and exhaust chamber 29. It will also be assumed that slide block 72 is located such that frusto-conical surface 80 sealingly engages valve seat 39 and that valve member 52 has valve surface 59 sealingly engaged against frusto-conical surface 79. Under these conditions, the control system 12, by known means, has received input from the gas turbine engine 1 such that the control means 12 can determine the control pressures of the fluids through conduits 13 and 14 which controls the position of the valve member 40 relative to the valve body 21 and the partition 27. As the valve member 40 is adjusted relative to the valve body 21, the cross-sectional area of the opening 110 will also be varied so as to meter the fluid passing the between the high pressure feed chamber 28 and the exhaust chamber 29. When the main fuel pump 4 delivers a pressurized fuel flow into the high pressure feed chamber 28, the pressurized fluid crosses the opening 110 and is moved from the exhaust chamber 29, through the conduit 7 into the gas turbine engine 1. When the pressure in the exhaust chamber increases and, hence, the fluid flow through the passage 11 0, the valve member 40 is forced toward the end 24, as illustrated in FIG. 3 due to the increased pressure in control chamber 63 acting on face 56 of piston 55 and transverse wall 45 of the valve 40. Such movement towards the left as illustrated in FIGS. 2 and 3, decreases the cross-sectional area of the opening 110 due to the oblique valve surface 47 until the desired magnitude of fluid flow is once again obtained. Clearly, the operation of the device is similar if the fluid flow were to decrease, the displacement of the valve member 40 would then be away from end 24 (towards the right as illustrated in FIG. 3) thereby increasing the cross-sectional of the opening 110 allowing the flow into the conduit 7 to also increase.

Figure 4:
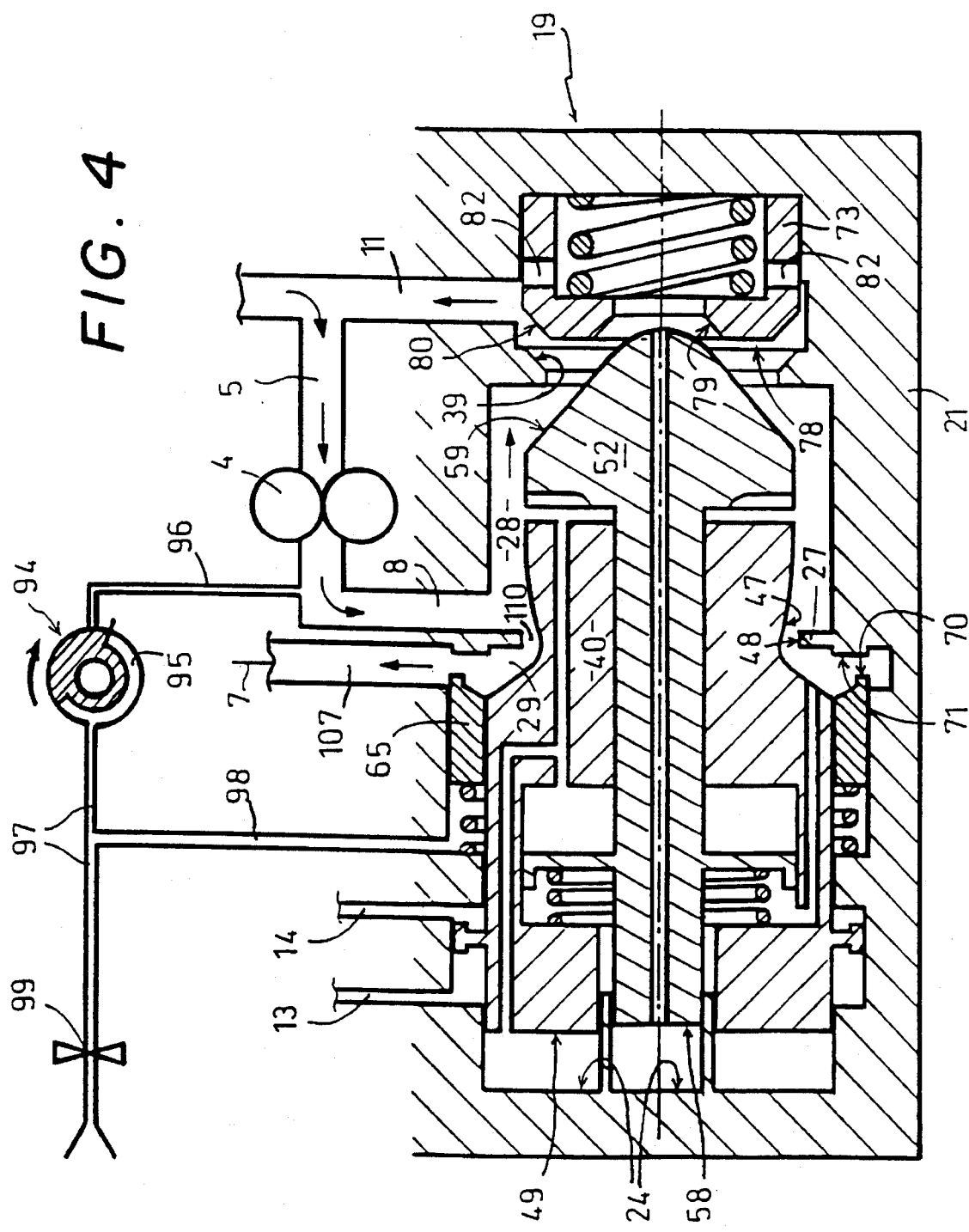
FIG. 4 is a cross-sectional view similar to FIG. 2, illustrating the regulator in a third operational configuration.

Typically, at some time after engine start up, the fluid flow delivered by the main pump 4 exceeds the fluid flow required to feed the gas turbine engine 1. To evacuate the excess fluid delivered by the main pump into the high pressure feed chamber 28, the second valve member 52 which regulates the pressure in chamber 28 is displaced toward the end 24 (toward the left as illustrated in FIG. 4) such that the valve surface 59 is displaced away from the frusto-conical surface 79 of the slide box 72. Thus, the excess fluid received in the high pressure feed chamber 28 may escape from this chamber via opening 78, cavity 76 and passages 82 into the bypass chamber 77 from which it will be returned to the inlet of the main pump 4 via conduits 11 and 5.

Under certain circumstances, the increase in pressure of the fluid in the high pressure feed chamber 28 may be larger and more rapid than can be accommodated by displacement by valve member 52 away from the slide block 72. In this instance, the excess fluid must be evacuated from the high pressure feed chamber 28 more rapidly to prevent such excess pressure from causing damage to the fluid circuit. The pressure in the feed chamber 28 acts on surface 78 to cause the slide block 72 to move towards the right (as illustrated in FIG. 5) against the bias of spring 85. Such movement displaces the frusto-conical surface 80 away from the frusto-conical valve seat 39 so as to enable the high pressure feed chamber 28 to communicate directly with the bypass chamber 77 without detouring through the slide block cavity 76. From the bypass chamber 77, the excess fluid returns to the main pump 4 by conduits 11 and 5. Once the excess pressure in high pressure feed chamber 28 has subsided, spring 85 urges the slide block 72 back toward the position illustrated in FIG. 4.

In order to terminate operation of the gas turbine engine, the fluid flow to the engine 1 should be completely cut off. This is achieved by control valve 94 as illustrated in FIG. 6, by moving the movable valve element 93 so as to allow communication between conduits 96 and 97. Such communication enables high pressure fluid from the main pump 4 to pass through conduit 96, valve chamber 95, conduit 97, and conduit 98 into actuating chamber 68, such that the high pressure fluid acts on surface 69 of valve piston 65. This urges valve piston 65 towards the right (as illustrated in the figures) such that surface 70 will sealingly contact surface 71 closing off communication between the exhaust chamber 29 and the exhaust conduit 107, thereby cutting off all fuel flow to the engine 1. Obviously, the operation of the device will be similar regardless whether the valve 94 is utilized, or the alternative valve 1 00 illustrated in FIGS. 7 and 8 is utilized.

The coaxial pressurized fluid flow regulator 19 according to this invention provides for direct metering of the flow of fluid to the operational device 1; it regulates the pressure of the fluid supplied to the operational circuit; it provides protection against excess pressure build up; and enables the stoppage of the supply of fluid to the operational circuit. In addition to providing all of these operations in one assembly, the present regulator assembly is more compact and lighter than the previously known assemblies of several distinct components.

The magnitudes of the regulating pressures of the fluid in conduits 13 and 14 may be set exclusively by a hydraulic device or by an electronically controlled servo valve.

The foregoing description is provided for illustrative purposes only and should not be construed as in any way limiting this invention, the scope of which is defined by the appended claims.

We claim:

1. A pressurized fluid flow regulator for controlling fluid in a fluid circuit having a source of pressurized fluid with an inlet and an outlet, the assembly comprising:

a) a valve body defining a high pressure feed chamber in fluid communication with the outlet of the source of pressurized fluid, an exhaust chamber having an inlet in fluid communication with the high pressure feed chamber and a fluid outlet, and a bypass chamber having an inlet in fluid communication with the high pressure feed chamber and an outlet in fluid communication with the inlet of the source of pressurized fluid;

(b) first valve means to meter the flow of fluid between the high pressure feed chamber and the exhaust chamber wherein the first valve means comprises a first valve member slidably located in the valve body so as to slide along an axis of movement;

(c) second valve means to open and close the fluid outlet of the exhaust chamber; and (d) third valve means to control the opening and closing of the bypass chamber inlet such that the bypass chamber inlet is opened when the fluid pressure in the high pressure feed chamber exceeds a threshold value, wherein the third valve means comprises:

i) a first valve seat defined by the valve body adjacent to the bypass chamber inlet;

ii) a slide block slidably located in the bypass chamber, the slide block having a central passage in fluid communication with the bypass chamber; and, ii) a second valve member slidably located in the valve body, the second valve member having a second valve surface with a generally conical configuration so as to seal the central passage when the second valve member contacts the slide block.

2. The pressurized fluid flow regulator of claim 1 wherein the high pressure feed chamber, the exhaust chamber and the bypass chamber have a common central axis.

3. The pressurized fluid flow regulator of claim 1 further comprising:

a) a partition between the high pressure feed chamber and the exhaust chamber having a substantially cylindrical opening so as to permit fluid communication between the high pressure feed chamber and the exhaust chamber; and b) a flow regulating surface on the first valve member which extends through the substantially cylindrical opening, the flow regulating surface extending obliquely to the axis of movement.

4. The pressurized fluid flow regulator of claim 3 wherein the obliqueness of the flow regulating surface varies in a direction along the axis of movement.

5. The pressurized fluid flow regulator of claim 1 further comprising control means to control the movement of the second valve member, the control means comprising:

a) means defining a cylinder; and b) a piston attached to the second valve member and slidably located in the cylinder so as to define a first actuating chamber in fluid communication with the high pressure feed chamber such that fluid from the high pressure feed chamber acts on one side of the piston and a second actuating chamber in fluid communication with the exhaust chamber such that the fluid from the exhaust chamber acts on opposite side of the piston.

6. The pressurized fluid flow regulator of claim 5 wherein the second valve member is slidably attached to the first valve member and wherein the first valve member defines the cylinder.

7. The pressurized fluid flow regulator of claim 1 further comprising:

a) a third valve surface formed on the slide block in contact with the fluid in the high pressure feed chamber; and b) biasing means acting on the slide block urging it into contact with the first valve seat such that it will be displaced away from the first valve seat when fluid pressure in the high pressure feed chamber exceeds a threshold value.

8. The pressurized fluid flow regulator of claim 1 wherein the second valve means comprises a valve piston slidably located in the valve body and further comprising control means to control the position of the valve piston so as to open and close the exhaust chamber outlet.

9. The pressurized fluid flow regulator of claim 8 wherein the control means comprises:

a) a first surface of the valve piston acted on by the fluid in the exhaust chamber;

b) means defining a third actuating chamber such that fluid in the third actuating chamber acts on a second surface of the valve piston facing generally away from the first surface of the valve piston; and c) a control valve having an inlet in fluid communication with the outlet of the source of pressurized fluid and an outlet in fluid communication with the third actuating chamber.

* * * * *